Patented Mar. 27, 1923.

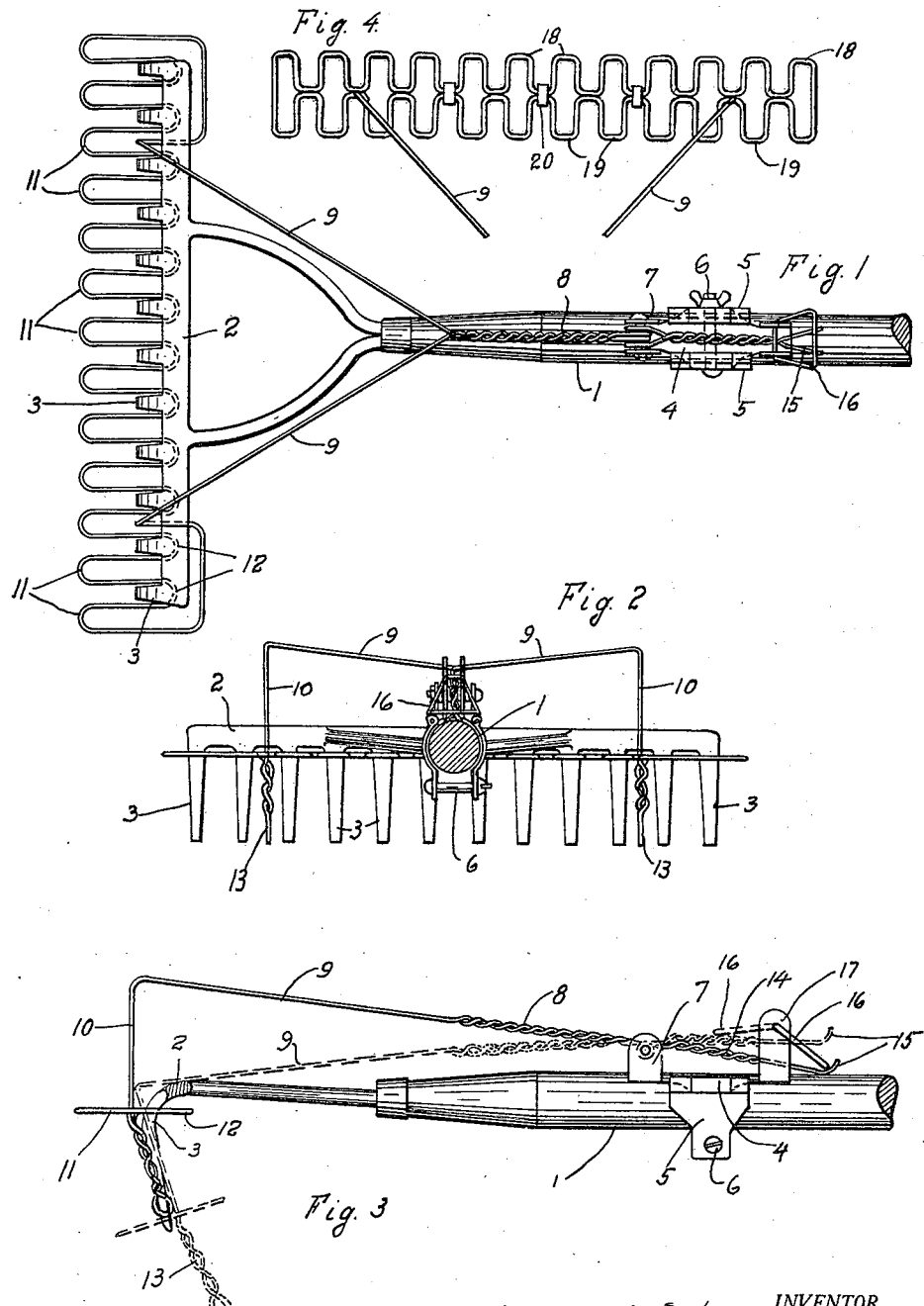

1,449,673

UNITED STATES PATENT OFFICE.

PAUL O. HECHT, OF DAVENPORT, IOWA.

CLEANING ATTACHMENT FOR RAKES.

Application filed April 16, 1921. Serial No. 461,764.

*To all whom it may concern:*

Be it known that I, PAUL O. HECHT, a citizen of the United States, residing at Davenport, in the county of Scott and State of Iowa, have invented certain new and useful Improvements in Cleaning Attachments for Rakes, of which the following is a specification.

My invention relates to an automatic cleaning attachment for rakes, and is specially designed for use in connection with lawn and garden rakes. It is of a simple construction, and can be readily fixed in place on a rake. The device is also provided with means for holding the same in an inoperative position, when it is desired to use the same as a garden rake.

In the drawings:

Fig. 1 shows the toothed end of a rake of usual construction, with the invention attached thereto.

Fig. 2 is an inner end view of the rake-head.

Fig. 3 is a side view thereof, with the attachment locked in an inoperative position.

Fig. 4 shows a modified form of the cleaning rack.

1 represents the end of a rake handle, to which is attached a rake head 2, provided with teeth 3. Fixed to the handle 1 by means of a pair of wings 5 is a plate 4, said wings having a hinged connection with said plate, said wings being held together by a bolt 6. The wings 5 are curved to conform to the shape of the handle, and will readily accommodate themselves to handles of varying diameters. At one of its ends the plate 4 is provided with a pair of ears 7, between which is pivoted a coiled arm 8 of a pair of rods 9, which extend outwardly to points near the ends of the rake head, where they are provided with angular portions 10, connected with which is a cleaning rack, formed of alternating loops 11 and 12, the loops 12 passing round the teeth 3, in close proximity thereto. At the point of junction between the parts 10 and rack there are formed fingers 13, projected in the same direction as the teeth 3.

As the teeth of the rake are engaged with the ground the fingers 13 are forced upwardly, carrying with them the cleaning rack, into the position shown in Fig. 3 of the drawings. Upon the rake being raised from the ground, the rack falls by gravity, stripping the material from the teeth 3 which has been collected thereon. The downward movement of the rack is limited by the rods 9 coming in contact with the upper face of the rake-head 2, as shown in broken lines in Fig. 3.

The member 8 is provided with a rearward extension 14, having curved ends 15 adapted for engagement by a link 16, pivoted in ears 17 on the end of the plate 4 opposite to the ears 7. By this means the cleaning rack is held out of operative position, as shown in Fig. 3. The tool can then be used as a garden rake, without the cleaning member interfering with the teeth of the rake. When it is desired to use the attachment the link 16 is tipped forwardly as shown in broken lines in Fig. 3.

The loops 11 and 12, fingers 13, arms 10, rods 9, and coiled portions 8 and 14 are preferably formed of a single piece of wire of suitable size and strength. This not only lessens the cost of production thereof, but also reduces the weight.

In Fig. 4 is shown a form of the cleaning rack, in which the loops 11 and 12 are replaced by loops 18 and 19, formed of two parts, each integral with one of the arms 9. The series of loops are united centrally by clips 20.

What I claim and desire to secure by Letters Patent, is:

A device of the class described, comprising a clamp-plate, provided at its sides with hinged wings for adjustable attachment to a rake handle, and fitted at its ends with spaced apart pairs of ears; a supporting arm pivoted between one of said pairs of ears, and provided with a rearward extension outwardly curved at its end; a cleaning rack operatively connected with said arm, and provided with fingers projected downwardly therefrom; and a link pivoted in said other pair of ears, and adapted to engage the curved end of said extension, to lock said supporting arm from movement, with said cleaning rack out of operative position.

In testimony whereof I affix my signature.

PAUL O. HECHT.